Feb. 23, 1926. Re. 16,275
C. SMITH
INDIRECT WATER HEATING APPARATUS
Original Filed May 6, 1919
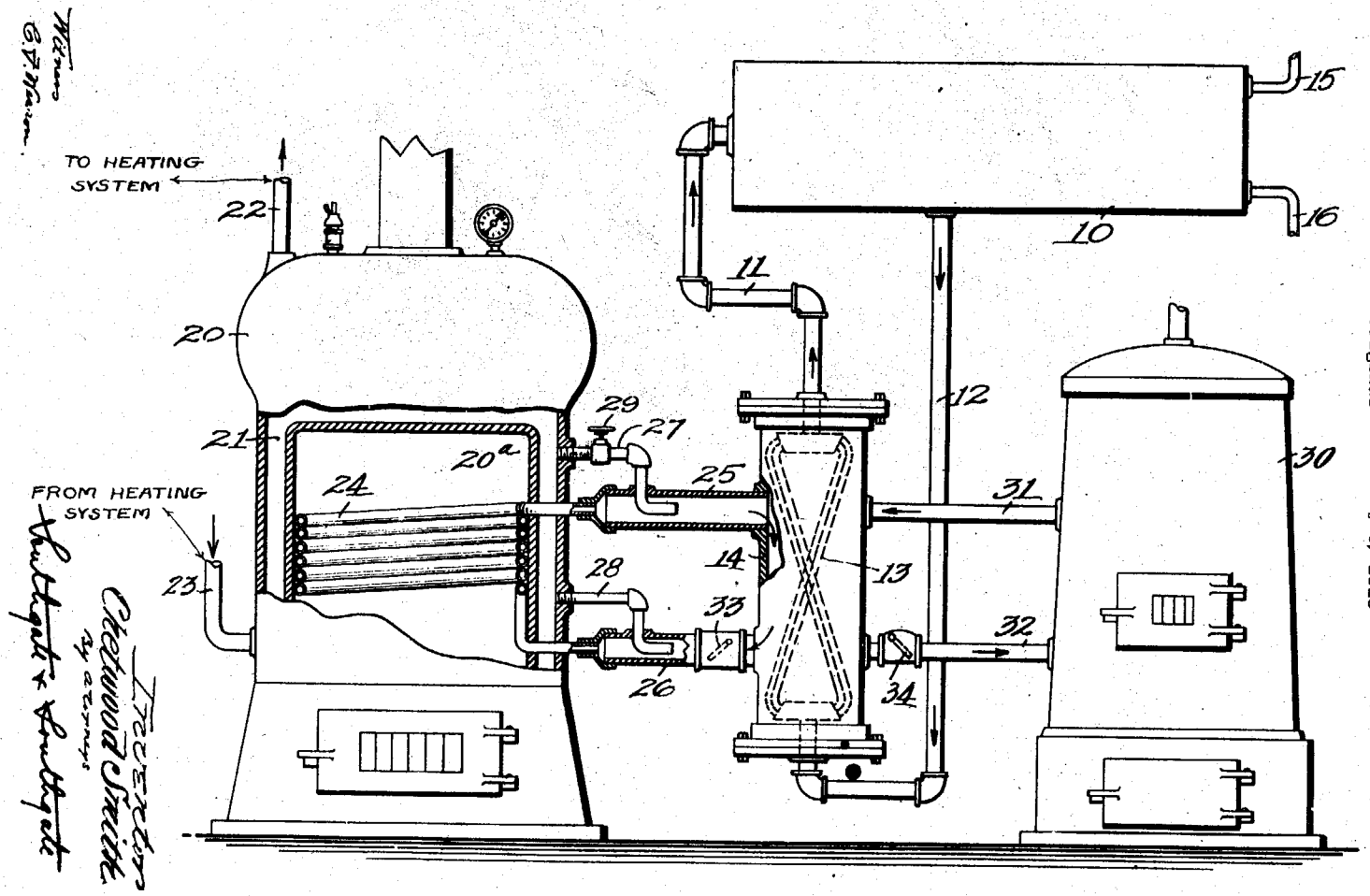
Witness
C. V. Nason
Inventor
Chetwood Smith
By Attorneys
Southgate & Southgate Reissued Feb. 23, 1926. Re. 16,275

UNITED STATES PATENT OFFICE.

CHETWOOD SMITH, OF WORCESTER, MASSACHUSETTS, ASSIGNOR TO STACK HEATER COMPANY, OF BOSTON, MASSACHUSETTS, A CORPORATION OF MASSACHUSETTS.

INDIRECT WATER-HEATING APPARATUS.

Original No. 1,379,581, dated May 24, 1921, Serial No. 295,219, filed May 6, 1919. Application for reissue filed March 26, 1923. Serial No. 627,887.

*To all whom it may concern:*

Be it known that I, CHETWOOD SMITH, a citizen of the United States, residing at Worcester, county of Worcester, and State of Massachusetts, have invented a new and useful Indirect Water-Heating Apparatus, of which the following is a specification.

This invention relates to water heating apparatus of the type in which the water is heated indirectly by the circulation of hot water in contact with containers of the water to be heated, but not in open communication therewith.

It is more or less common to install such indirect heating apparatus in combination with the main water heater of a hot water or steam house heating system, the indirect heating chamber of said indirect heating apparatus being connected to an auxiliary heating device in the main water heater. When thus combined, it is no longer possible to regulate the fire with reference to the demand for hot water from the storage tank associated with the indirect heating apparatus as the fire must be run to provide a desired temperature in the house heating system. A very hot fire may thus be required for long periods of time in cold weather, while at the same time the demand for hot water from the storage tank may be very limited. Under these conditions, the water in the indirect heating apparatus or in the storage tank associated therewith may become dangerously overheated, unless provision is made for withdrawing or diverting the surplus heat therefrom.

It is the object of my invention to provide an improved construction in such a combined heating system which will automatically prevent overheating in the indirect heating apparatus or its associated storage tank and which will permit transfer of heat therefrom to the main heating system whenever the supply of heat thereto becomes excessive.

For the attainment of this object, my invention in its preferred form contemplates the provision of such connections between a main heating system and an indirect heating apparatus that surplus heat may be freely transferred from the indirect heating apparatus to the main heating system. More specifically, I have shown branch connections from the indirect heating apparatus to the main heating system, such that a free interchange of heat may at times occur. Under usual conditions, the water circulates in a normal path through the auxiliary heating device and through the water space of the indirect heating chamber but a secondary path of circulation is provided by my improvements effective to prevent overheating under abnormal conditions.

My invention further consists in certain arrangements and combinations of parts which will be hereinafter described and more particularly pointed out in the appended claims.

A preferred form of my invention is shown in the drawing which is a front elevation, partly in section, of my improved heating apparatus.

In this drawing I have shown a hot water storage sank 10, connected by suitable pipes 11 and 12 to the ends of an indirect heater comprising a nest of pipes 13 disposed in an indirect heating chamber 14. A distributing pipe 15 and supply pipe 16 are connected to the tank 10 as usual.

A main water heater of a heating system is shown at 20, having a water space 21, and provided with circulation pipes 22 and 23, the main heater 20 and the circulation pipes 22 and 23 forming part of a main steam or hot water heating system of the usual type. Any suitable auxiliary heating device, such as a coil 24, is disposed within the heater 20 or its firebox 20[a] and pipes 25 and 26 extend from the auxiliary heating device 24 to the indirect heating chamber 14.

Additional connections or branch pipes 27 and 28 connect the water space 21 to the pipes 25 and 26, the ends of the pipes 27 and 28 extending a certain distance within the pipes 25 and 26 toward the indirect heating chamber 14. A valve 29 is provided in the pipe 27 by which the flow of water therethrough may be controlled.

The numeral 30 indicates a supplementary water heater of any convenient form, intended for use when the main house heater is not in operation. The supplementary heater 30 is connected by pipes 31 and 32 to the indirect heating chamber 14. Check valves 33 and 34 are provided in the pipes 26 and 32, each check valve opening away from the indirect heating chamber 14.

With this construction it will be seen that hot water for the indirect heating chamber 14 may be provided from the auxiliary heating device 24 or from the supplementary heater 30, and that the arrangement of piping shown herein prevents interchange of heat between the heating chamber 14 and a heater or heating device which is not in operation.

Special advantages result from the use of the branch connections shown between the auxiliary heating device 24 and the main water heater 20, formed by connecting the pipes 27 and 28 into the pipes 25 and 26. Under normal conditions of operation, the water in the auxiliary heating device 24 will be at a considerably higher temperature than the water in the main water heater 20, as the auxiliary heating device 24 is in more direct contact with the fire.

If the difference in temperature is not too great, the water circulates as indicated by arrows in the drawing, and raises the temperature of the water in the tank 10. If, however, only a small quantity of water is being drawn from the tank, the temperature of the water in the auxiliary heating device 24 and in the chamber 14 may be materially above the temperature of the water in the main water heater 20.

When this occurs, the path of flow of the water leaving the auxiliary heating device 24 is changed in the pipe 25 and the highly heated water passed through the branch pipe 27 to the water space 21. At the same time a portion of the cooler water in the main water heater 20 passes out through the branch pipe 28 and returns to the auxiliary heating device through the pipe 26. The excess of heat in the auxiliary heating device 24 is thus distributed through the large volume of water in the main water heater 20, and undue rise of temperature in the auxiliary heating device 24 or in the indirect heating chamber 14 is prevented. This system of connections also renders unnecessary the provision of gages or relief valves on the indirect heating chamber 14 as the usual relief devices on the main water heater answer all purposes.

The difference in temperature necessary to cause such heat interchange depends to a large extent upon the extension of the pipes 27 and 28 toward the chamber 14 and may also be varied as desired by manipulation of the valve 29.

Having thus described my invention, it will be seen that changes and modifications can be made therein by those skilled in the art within the scope of my invention as expressed in the claims, and I do not wish to be otherwise limited to the details herein disclosed, but what I claim is:—

1. A water heating apparatus comprising an indirect heating chamber, a main water heater, an auxiliary heating device capable of heating water to a higher temperature, and connections permitting the flow of water from said device to said heating chamber under normal conditions and permitting the flow of water from said device to said main water heater whenever the temperature of the water in said auxiliary heating device and in said indirect heating chamber materially exceeds the temperature of the water in said main water heater.

2. A water heating apparatus comprising an indirect heating chamber, a storage tank in heat exchange relation with said chamber, a relatively small auxiliary heating device, circulation pipes connecting said auxiliary heating device to said indirect heating chamber, a relatively large main water heater, and branch connections from said pipes to said main water heater.

3. A water heating apparatus comprising a main water heater adapted to form a portion of a building heating system, an indirect heating chamber, an auxiliary heating device associated with said main water heater, circulation pipes from said auxiliary device heating to said indirect heating chamber, and branch connections from said main water heater to said circulation pipes.

4. A water heating apparatus comprising an indirect heating chamber, a main water heater, an auxiliary heating device capable of heating water to a higher temperature, upper and lower passages connecting said auxiliary heating device to said indirect heating chamber and branch pipes connecting said passages to said main water heater, said pipes being extended into and along said passages in a direction away from said auxiliary heating device.

5. The combination with a hot water heating system having a main heater, of an indirect heating apparatus comprising an indirect water heater, an auxiliary heating device in the main heater, connections providing a circulating path for water between said auxiliary heating device and said indirect water heater, connecting means providing a secondary or relief path for the circulating water from the indirect heating apparatus into the heating system, and means for varying the resistance to flow through the secondary path.

6. The combination with a hot water heating system having a main heater, of an indirect heating apparatus comprising an indirect water heater, an auxiliary heating device in the main heater, connections providing a circulating path for water between said auxiliary heating device and said indirect water heater, connecting means providing a secondary or relief path for the circulating water from the indirect heating apparatus into the heating system, and a choke valve in the secondary path adjustable to impede in a greater or less degree the flow of circulating water through said secondary path.

7. The combination with a heating system having a main water heater, of an indirect water heater having conducting means therein for the water to be heated and for the circulating heating water, an auxiliary heating device in the main water heater, connections forming with said auxiliary heating device and said indirect water heater a normal circuit for said circulating heating water, and means connecting said normal circuit and said heating system and providing a secondary path of flow for said circulating heating water into said heating system under abnormal conditions, whereby excess heat in said circulating heating water may be transferred to the mass of water in said heating system.

8. The combination with a heating system having a main water heater, of an indirect water heater having conducting means therein for the water to be heated and for the circulating heating water, an auxiliary heating device in the main water heater, connections forming with said auxiliary heating device and said indirect water heater a normal circuit for said circulating heating water, means connecting said normal circuit and said heating system and providing a secondary path of flow for said circulating heating water into said heating system under abnormal conditions, whereby excess heat in said circulating heating water may be transferred to the mass of water in said heating system, and regulating means to increase or diminish the resistance to flow of the circulating heating water through said secondary path.

9. Means for heating water comprising a main water heater, an indirect heating apparatus including an indirect water heater and an auxiliary heating device for said indirect water heater, a storage tank in heat exchange relation with said indirect heater, and water circulating connections between said parts, said connections including a passage to said main water heater from said indirect heating apparatus, whereby excess temperature or pressure in said apparatus may be relieved.

10. Means for heating water, having, in combination, a relatively large main water heater, an indirect water heating apparatus comprising an indirect heating chamber, a storage tank in heat exchange relation with said chamber, a relatively small auxiliary water heating device in said main heater, and connections from said auxiliary heating device to said indirect heating chamber and from said indirect heating apparatus to said main heater, whereby excess temperature or pressure in said indirect heating apparatus may be relieved.

11. The combination with a heating system having a main water heater, of an indirect heating apparatus comprising an indirect water heater, an auxiliary heating device in said main water heater, connections providing for the circulation of hot water through said auxiliary heating device and said indirect water heater under normal temperature conditions, and connecting means providing a secondary passage for the circulating heating water from said indirect heating apparatus through said heating system when the circulating heating water becomes overheated.

12. The combination with a heating system having a main water heater, of an indirect heating apparatus comprising an indirect heater having separate channels for the water to be heated and for circulating heating water respectively, an auxiliary heating device in the main water heater having connections with the channel for circulating heating water, and connecting means providing a return flow of said circulating heating water to said auxiliary heating device through said heating system.

13. Means for heating water indirectly comprising a main water heater, an indirect heating apparatus, an auxiliary heating device and connecting means between the indirect heating apparatus, and the auxiliary heating device and the main water heater effective to limit the relative temperature of the indirectly heated water.

In testimony whereof I have hereunto affixed my signature.

CHETWOOD SMITH.